United States Patent
Lou

(10) Patent No.: US 7,835,880 B2
(45) Date of Patent: Nov. 16, 2010

(54) METHODS FOR IMPROVING ACCURACY OF MEASUREMENT AND CALIBRATION OF ACCELEROMETER PARAMETERS

(75) Inventor: Ruey-Der Lou, Hsinchu (TW)

(73) Assignee: IMU Solutions, Inc. (TW)

( * ) Notice: Subject to any disclaimer, the term of this patent is extended or adjusted under 35 U.S.C. 154(b) by 141 days.

(21) Appl. No.: 12/286,448

(22) Filed: Sep. 29, 2008

(65) Prior Publication Data
US 2009/0138224 A1    May 28, 2009

Related U.S. Application Data

(60) Provisional application No. 60/997,063, filed on Sep. 29, 2007.

(51) Int. Cl.
G06F 19/00 (2006.01)
G01P 15/00 (2006.01)

(52) U.S. Cl. .................................. 702/104; 73/514.01

(58) Field of Classification Search ................ 702/104, 702/85, 95; 73/1.37, 497, 514.01, 514.02, 73/1.38; 345/166
See application file for complete search history.

(56) References Cited

U.S. PATENT DOCUMENTS 7,013,207 B2 * 3/2006 Majstorovic et al. .......... 701/51
2006/0251334 A1 * 11/2006 Oba et al. .................... 382/275
2006/0272413 A1 * 12/2006 Vaganov et al. ........... 73/514.01
2009/0056411 A1 * 3/2009 Goujon et al. ................ 73/1.37

* cited by examiner

Primary Examiner—Bryan Bui
(74) Attorney, Agent, or Firm—Bo-In Lin

(57) ABSTRACT

A method is disclosed in this invention for calibrating an offset $V_{offset}$ and sensitivity $V_{sensitivity}$ for an accelerometer implemented in a level gauge having a known value of an offset angle $\theta_A$ and a known value of a relative angle between top-and-bottom surface $\theta_S$. The method includes a step of placing the level gauge implemented with the accelerometer on a table-top surface having a tilt angle $\theta 1$ and measuring a tilt angle $\theta_F$ from the level gauge and an output voltage $V_F$ from the accelerometer, then rotating the level gauge 180 degrees on the table-top surface along a perpendicular axis relative to the table top surface and measuring a tilt angle $\theta_B$ from the level gauge and measuring an output voltage $V_B$ from the accelerometer. Then, the method proceeds with a step of flipping the level gauge upside down on the table-top surface and measuring a tilt angle $\theta_R$ from the level gauge and an output voltage $V_R$ from the accelerometer for calculating a tilt angle $\theta_1$ of the table-top surface and the offset $V_{offset}$ and sensitivity $V_{sensitivity}$ of the accelerometer.

10 Claims, 2 Drawing Sheets

Tabletop Surface

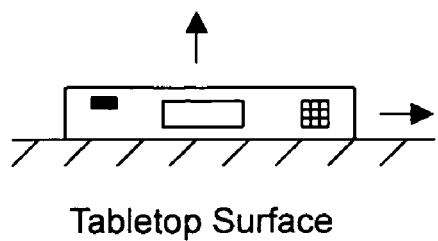
Tabletop Surface
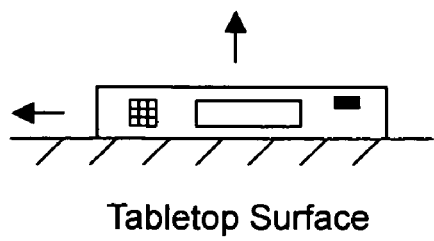
Tabletop Surface
Fig. 4A　　　　　　　　　　Fig. 4B
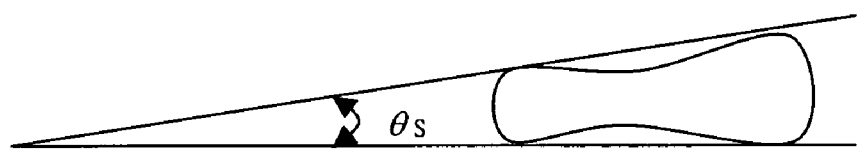
Fig. 5
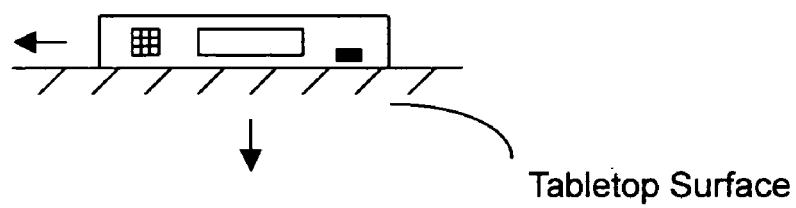
Fig. 6

METHODS FOR IMPROVING ACCURACY OF MEASUREMENT AND CALIBRATION OF ACCELEROMETER PARAMETERS

This Non-provisional application claims a Priority Date of Sep. 29, 2007 benefited from a Provisional Patent Applications 60/997,063 filed by an Applicant as one of the Inventors of this Application. The disclosures made in Patent Application 60/997,063 are hereby incorporated by reference in this application.

BACKGROUND OF THE INVENTION

1. Field of the Invention

This invention relates generally to a method for calibrating and operating an accelerometer device. More particularly, this invention relates to methods of improving the processes and accuracy of measurements and calibration of accelerometer parameters.

2. Description of the Prior Art

Conventional techniques for carrying out accelerometer measurements and calibrations still have technical difficulties and limitations. The accelerometers generally generate three types of output signals. The first type of output signal is an analog signal such as an output voltage. The second type of output signal is a digital pulse width modulation (PWM) signal. The PWM signal has time duration with a length that represent the duty cycle corresponding to the voltage of the analog signal. The third type of output signal is a sequence of binary digital pulse that represents the voltage of the analog signal. For the purpose of simplifying the explanations, the following discussions of calibration of accelerometers use examples of analog signals while the technical principles and descriptions are applicable to all three types of output signal.

An output voltage $V_{output}$ is generated from an accelerometer when an acceleration represented by a parameter "a" is detected along the axes of the accelerometer. The acceleration "a" can be calculated from output voltage $V_{output}$ as:

$$\text{Acceleration } a = \left( \frac{V_{output} - V_{offset}}{V_{sensitivity}} \right) \cdot g \quad (1)$$

There are two important accelerometer parameters, namely $V_{offset}$ and $V_{sensitivity}$ employed to compute the acceleration "a" according to Equation (1). The parameter $V_{offset}$ representing an output voltage when there is no acceleration, i.e., when acceleration "a"=0. The parameter "g" in Equation (1) represents the gravity acceleration and in the following equations, $V_g$ represents the voltage output when the acceleration value of the accelerometer has a value of "g". As discussed above, the output signal from an accelerometer can also be a duty cycle of a pulse according to a pulse width modulation process for output signal generation or a pulse stream representing the voltage of the analog signal. In the above Equation (1):

$$V_{sensitivity} = V_g - V_{offset} \quad (2)$$

Initially, a manufacturer of the accelerometer provides the values of these two parameters $V_{offset}$ and $V_{sensitivity}$ and the user of the accelerometer then applies the values of these two parameters and Equations (1) and (2) to measure and determine the accelerations according to the output voltages or the duty of the pulse width. However, the values of these two parameters $V_{offset}$ and $V_{sensitivity}$ drift gradually and become inaccurate for acceleration computations. Inaccuracies of acceleration measurements are generated due to the value drifts of these two parameters. More particularly, the general practice of the manufacturers now is to measure the values of $V_{offset}$ and $V_{sensitivity}$ of the accelerometer based on the output voltages of an accelerometer along either a horizontal or a vertical direction. A user of the accelerometer is however unable to repeat such measurements in order to recalibrate the values of $V_{offset}$ and $V_{sensitivity}$. With such limitation, the user of an accelerometer has limited option but to continue to use an accelerometer with the built in values of the $V_{offset}$ and $V_{sensitivity}$ that continues to drift with time thus seriously affecting the accuracy and usefulness of the accelerometers.

Therefore, a need still exists in the art of accelerometer measurements, calibrations and operation to provide new and improved methods and processes to overcome the above-discussed difficulties and limitations.

SUMMARY OF THE PRESENT INVENTION

Therefore, one aspect of this invention is to provide new and improved methods and device configurations for measuring and calibrating the values of $V_{offset}$ and $V_{sensitivity}$ such that the above-discussed problems and limitation encountered in the conventional accelerometers can be resolved.

Another aspect of this invention is to provide new and improved methods of measurements and calibration to measure and calibrate these operational parameters either with measurement and calibration equipment available in a manufacturer's factory or by using directly measurements of an accelerometer without such specific measurement and calibration equipment.

In the descriptions of embodiments provided below, the accelerometers are described in applications for level measurements. However, the methods can be applied and suitable for different kind applications as well. The descriptions of the exemplary embodiments assume measurements of acceleration along one axis, but the same principles and methods would also be suitable and applicable for applications of acceleration measurement along axes for two or three dimensional acceleration measurements.

In an exemplary embodiment, this invention discloses a method for calibrating an offset $V_{offset}$ and sensitivity $V_{sensitivity}$ for an accelerometer implemented in a level gauge having a known value of an offset angle $\theta_A$ and a known value of a relative angle between top-and-bottom surface $\theta_s$. The method includes a step of placing the level gauge implemented with the accelerometer on a table-top surface having a tilt angle $\theta 1$ and measuring a tilt angle $\theta_F$ from the level gauge and an output voltage $V_F$ from the accelerometer, then rotating the level gauge 180 degrees on the table-top surface along a perpendicular axis relative to the table top surface and measuring a tilt angle $\theta_B$ from the level gauge and measuring an output voltage $V_B$ from the accelerometer. The method further includes a step of flipping the level gauge upside down on the table-top surface and measuring a tilt angle $\theta_R$ from the level gauge and an output voltage $V_R$ from the accelerometer for calculating a tilt angle $\theta_1$ of the table-top surface and the offset $V_{offset}$ and sensitivity $V_{sensitivity}$ of the accelerometer. In an exemplary embodiment, the step of calculating the tilt angle $\theta_1$ of the table-top surface and the offset $V_{offset}$ and sensitivity $V_{sensitivity}$ of the accelerometer further comprising a step of applying and solving following equations:

$$\theta_F = \theta 1 + \theta_A.$$

$$V_F = V_{sensitivity} \cdot \sin(\theta 1 + \theta_A) + V_{offset}$$

$$V_B = V_{sensitivity} \cdot \sin(\theta_A - \theta 1) + V_{offset}$$

$$\theta_R = 180° - \theta_s + \theta_A + \theta 1$$

$$V_R = V_{sensitivity} \cdot \sin(180° - \theta_s + \theta_A + \theta 1) + V_{offset}$$

And, by applying a known value of the known value of the offset angle $\theta_\Delta$ and the known value of the relative angle between top-and-bottom surface $\theta_s$. In another exemplary embodiment, the method further includes a step of measuring and calculating the offset $V_{sensitivity}$ and sensitivity $V_{offset}$ on two of the table-top surfaces having substantially different tilt angles for comparing values of the offset $V_{sensitivity}$ and sensitivity $V_{offset}$ and sending the accelerometer to a repair shop if a difference between the values of the offset $V_{sensitivity}$ and sensitivity $V_{offset}$ measured and calculated with two of the table-top surfaces exceeding a threshold value.

These and other objects and advantages of the present invention will no doubt become obvious to those of ordinary skill in the art after having read the following detailed description of the preferred embodiment, which is illustrated in the various drawing figures.

BRIEF DESCRIPTION OF THE DRAWINGS

FIGS. 4A and 4B are side views of an accelerometer rotated along a vertical axis with the front surface and back surface facing the front respectively.

FIG. 5 is a diagram for showing the angle $\theta_s$ implemented for calibration operation of this invention.

FIG. 6 is a side view of an accelerometer when the front surface of the accelerometer facing a user while the accelerometer is turned upside down.

DETAILED DESCRIPTION OF THE PREFERRED EMBODIMENT

Figure 1:
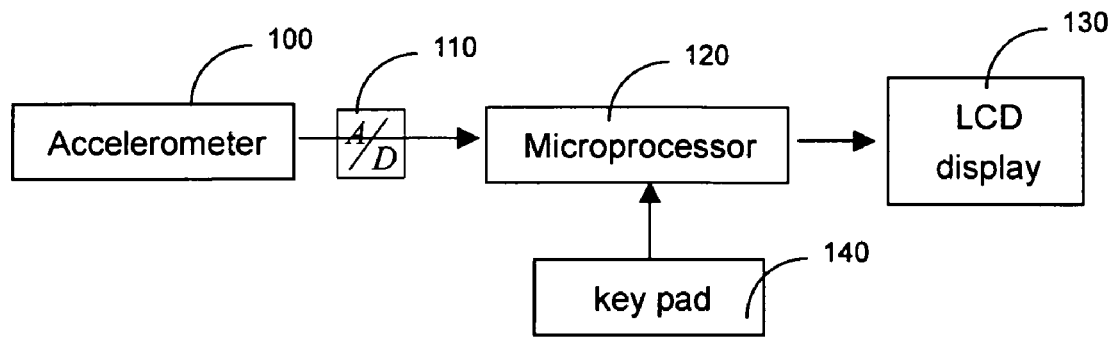
FIG. 1 shows a functional block diagram of an accelerometer for the level measurements implemented in this present invention for carrying out a calibration.

Referring to FIG. 1 for a functional block diagram showing the major functional blocks for a level gauge implemented with an accelerometer 100. The accelerometer 100 generates analog output signals for inputting to an analog to digital (A/D) converter 110 to generate digital signals. The digital signals are inputted into a microprocessor 120 connected to a display device 130 equipped with a keyboard 140 for a user to input instruction and data to the microprocessor 120. The microprocessor 120 receives periodically from the A/D converter 110 the output signals generated from the accelerometer 100. According to Equation (1) the acceleration "a" is represented as:

$$a = \frac{(V_{output} - V_{offset})}{V_{sensitivity}} \cdot g$$

When the axis of the accelerometer 100 is parallel to the bottom surface of the level gauge while the level gauge is tilted along an angle $\theta$ relative to the surface of the absolute horizontal level, the accelerometer detects an acceleration as:

$$a = g \cdot \sin\theta \quad (3)$$

Therefore, $$\sin\theta = \frac{(V_{output} - V_{offset})}{V_{sensitivyit}} \quad (4)$$

Or $$\theta = \sin^{-1}\left(\frac{V_{output} - V_{offset}}{V_{sensitivyit}}\right) \quad (5)$$

The microprocessor 120 receives the output signal $V_{output}$ is able to compute the tilt angle $\theta$ and display the value of the tilt angle $\theta$ on the LCD display 130. In these processes, an assumption is made that the axis of the accelerometer is parallel to the level gauge. However, in the manufacturing processes, the accelerometer 100 is packaged onto a printed circuit board (PCB) and the PCB is then packaged and assembled to a level gauge. There is an offset angle between the axis of the accelerometer and the level gauge. The offset angle is represented as $\theta_\Delta$. Therefore, the following equation represents the functional relationship between the angle and the output voltage $V_{output}$ generated from the accelerometer 100.

$$\theta + \theta_\Delta = \sin^{-1}\left(\frac{V_{output} - V_{offset}}{V_{sensitivyit}}\right) \quad (6)$$

The value of the offset angle $\theta_\Delta$ is unknown right after the level gauge is assembled. The following steps are carried out to measure the $V_{offset}$ and $V_{sensitivity}$. In order to carry out the steps, three surfaces P1, P2 and P3 are prepared and these three surfaces are along three angular positions represented by $\theta1$, $\theta2$ and $\theta3$ and $\theta2 = \theta1 + 90°$ $\theta3 = \theta1 + 180°$ Three voltages represented by V1, V2 and V3 are generated from the accelerometer 100 when the level gauge is placed on these three surfaces P1, P2, P3, then the following functional relationships exist.

$$\theta1 + \theta_\Delta = \sin^{-1}\left(\frac{V1 - V_{offset}}{V_{sensitivyit}}\right) \quad (7)$$

Or, $V1 = V_{sensitivity} \cdot \sin(\theta1 + \theta_\Delta) + V_{offset}$ \quad (8)

Furthermore:

$$\begin{aligned}
V2 &= V_{sensitivity} \cdot \sin(\theta2 + \theta_\Delta) + V_{offset} \quad (9)\\
&= V_{sensitivity} \cdot \sin(\theta1 + \theta_\Delta + 90°) + V_{offset}\\
&= V_{sensitivity} \cdot (\sin(\theta1 + \theta_\Delta)\cos 90° + \sin 90° \cos(\theta1 + \theta_\Delta)) + V_{offset}\\
&= V_{sensitivity} \cdot \cos(\theta1 + \theta_\Delta) + V_{offset}
\end{aligned}$$

$$\begin{aligned}
V3 &= V_{sensitivity} \cdot \sin(\theta_3 + \theta_\Delta) + V_{offset} \quad (10)\\
&= V_{sensitivity} \cdot \sin(\theta1 + \theta_\Delta + 180°) + V_{offset}\\
&= V_{sensitivity} \cdot (\sin(\theta1 + \theta_\Delta)\cos 180° + \cos(\theta1 + \theta_\Delta)\sin 180°) + V_{offset}\\
&= V_{sensitivity} \cdot (-1)\sin(\theta1 + \theta_\Delta) + V_{offset}
\end{aligned}$$

Accordingly:

$$V_{offset} = (V1 + V3)/2 \quad (11)$$

$$V_{sensitivity} = \sqrt{(V1 - V_{offset})^2 + (V2 - V_{offset})^2} \quad (12)$$

Figure 2:
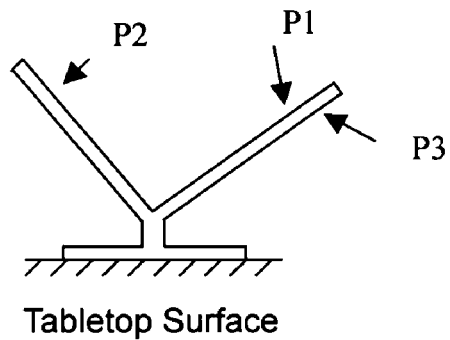
FIG. 2 is a perspective view of a support structure to provide three surfaces P1, P2, and P3 for carrying out calibration.

There are different ways to prepare the three surfaces. In one exemplary embodiment, an accurately controllable motor is applied to turn a platform to different angular position. FIG. 2 shows another exemplary embodiment, in which a platform includes two perpendicular surfaces to function as P1, P2 and P3 with relative angles represented by θ1, θ2, θ3, where:

θ2=θ1+90°

θ3=θ1+180°

Actually, the relative angles can be further arranged as:

θ2=θ1+Δθ12

θ3=θ1+Δθ13

Where Δθ12 is not necessarily equal to 90° and Δθ13 is not necessarily equal to 180° so long as these two angles Δθ12 and Δθ13 are two known values.

$$\begin{cases} V1 = V_{sensitivity} \cdot \sin(\theta 1 + \theta_\Delta) + V_{offset} & (13) \\ V2 = V_{sensitivity} \cdot \sin(\theta 1 + \theta_\Delta + \Delta\theta 12) + V_{offset} & (14) \\ V3 = V_{sensitivity} \cdot \sin(\theta 1 + \theta_\Delta + \Delta\theta 13) + V_{offset} & (15) \end{cases}$$

Since the values of V1, V2, V3, Δθ13, Δθ13 are known, the value of $(\theta 1 + \theta_\Delta)$ is an unknown value. A program to compute the value of $(\theta 1 + \theta_\Delta)$ can be implemented in the microprocessor 120 to obtain the value of $(\theta 1 + \theta_\Delta)$, $V_{sensitivity}$ and $V_{offset}$.

Figures 3A, 3B:
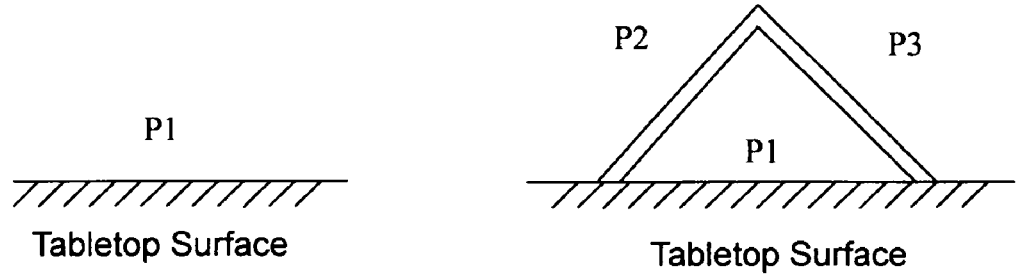
FIGS. 3A and 3B are side views of the top surface of a table functioning as surface P1 and structural frames functioning as P2 and P3 placed on the top surface of the table.

FIGS. 3A and 3B show another exemplary embodiment. FIG. 3A represents a surface P1, and FIG. 3B shows three surfaces P1, P2, and P3. These three surfaces can be applied with fixed Δθ12 and Δθ13 to carry out the voltage measurements to read three values of V1, V2 and V3 and to carry out the above analyses and computations to obtain the values. Since the values of $V_{offset}$ and $V_{sensitivity}$ will change with time, it is desirable to perform a recalibration to obtain accurate values of these parameters.

The calibration (or recalibration) processes of the level gauges can also be carried out without the three surfaces P1, P2, and P3 with fixed relative angular directions as described above. A user of the level gauge can carry out a calibration without requiring the structural platforms as shown in FIGS. 2 and 3. The method of calibration starts with a known value of $\theta_\Delta$ provided by a manufacturer. The following description shows the processes a manufacturer employs to obtain $\theta_\Delta$. The processes start with a level gauge placed on a top surface of a table as plan P1 with tilt angle θ1. An output voltage $V_F$ is generated from the accelerometer. Accordingly taking into consideration of the tilt angle $\theta_\Delta$ of the accelerometer relative to the level gauge, the accelerometer will tilt an angle $\theta_F$:

$\theta_F = \theta 1 + \theta_\Delta$, and $$V_F = V_{sensitivity} \cdot \sin(\theta 1 + \theta_\Delta) + V_{offset} \quad (16)$$

By rotating the level gauge along a vertical axis on the top surface of the table according to what is shown in FIG. 4B, the voltage generated by the accelerometer is $V_B$ and the tilt angle of the accelerometer is $\theta_B$.

$\theta_B = \theta_\Delta - \theta 1$ $$V_B = V_{sensitivity} \cdot \sin(\theta_\Delta - \theta 1) + V_{offset} \quad (17)$$

The value of $\theta_\Delta$ can be computed from Equations (16) and (17) with known values of $V_{sensitivity}$, $V_{offset}$, $V_F$, $V_B$ and θ1. The value of $\theta_\Delta$ is then stored in the microprocessor.

According to FIGS. 2 to 4, this invention discloses a method for calibrating an offset and sensitivity for an accelerometer. The method includes a step of placing the accelerometer on three flat surfaces with fixed relative angles among the three flat surfaces. The method further includes a step of measuring three output voltages of the accelerometer when the accelerometer is placed on each of the three flat surfaces to calculate and calibrate the offset and sensitivity for the accelerometer. In another exemplary embodiment, the method further includes a step of inputting the three output voltages of the accelerometer and the relative angles among the three flat surfaces to a microprocessor for calculating and calibrating the offset and sensitivity for the accelerometer. In another exemplary embodiment, the step of placing the accelerometer on three flat surfaces further comprising a step of placing a Y-shaped frame on a table top and placing the accelerometer on the table top as the first flat surface, placing the accelerometer on a first branch of the Y-shaped frame as the second flat surface, and placing the accelerometer on a second branch of the Y-shaped frame as the third flat surface wherein the first branch and second branch of the Y-shaped frame is maintained at fixed angles relative to the table top. In another exemplary embodiment, the step of step of placing the accelerometer on three flat surfaces further comprises a step of placing the Y-shaped frame on the tabletop with the second branch of the Y-shaped frame perpendicular to the first branch of the Y-shaped frame. In another exemplary embodiment, the step of placing the accelerometer on three flat surfaces further comprising a step of placing a triangular frame with a bottom side on a table top and placing the accelerometer on the table top as the first flat surface, placing the accelerometer on a first side of the triangular frame as the second flat surface, and placing the accelerometer on a second side of the triangular frame as the third flat surface wherein the first side and second side of the triangular frame is maintained at fixed angles relative to the table top. In another exemplary embodiment, the step of placing the accelerometer on three flat surfaces further comprises a step of placing the triangular frame with the bottom side on the tabletop with the second side of the triangular frame perpendicular to the first side of the triangular frame. In another exemplary embodiment, the method further includes a step of calibrating an offset angle $\theta_\Delta$ of a level gauge implemented with the accelerometer by placing the level gauge implemented with the accelerometer on a table-top surface having a tilt angle θ1 and measuring a tilt angle $\theta_F$ from the level gauge and an output voltage $V_F$ from the accelerometer, then rotating the level gauge 180 degrees on the table-top surface along a perpendicular axis relative to the table top surface and measuring a tilt angle $\theta_B$ from the level gauge and measuring an output voltage $V_B$ from the accelerometer for calculating the offset angle $\theta_\Delta$ of the level gauge. In another exemplary embodiment, the step of calculating the offset angle $\theta_\Delta$ of the level gauge further comprising a step of applying and solving following equations:

$\theta_F = \theta 1 + \theta_\Delta$, and $V_F = V_{sensitivity} \cdot \sin(\theta 1 + \theta_\Delta) + V_{offset}$, and $\theta_B = \theta_\Delta - \theta 1$ $V_B = V_{sensitivity} \cdot \sin(\theta_\Delta - \theta 1) + V_{offset}$ to compute the offset angle $\theta_\Delta$ of the level gauge.

Furthermore, the device implemented with the accelerometer such as a level gauge usually is enclosed in a housing structure that has a bottom surface and a top surface. As shown in FIG. 5, there may be an angle between the top surface and the bottom surface represented by angle $\theta_s$. This angle may be zero degree when the top surface and the bottom surface are in parallel or having a small non-zero value. FIG. 5 shows that the top surface and the bottom surface of the apparatus, such as a level gauge may be a flat surface or a curved surface. Either way, there is a relative angle $\theta_s$ between the top and the bottom surface. The value of the relative angle $\theta_s$ between the top and the bottom surface is provided by a device manufacturer, and this value may be stored in the microprocessor 120.

To start a calibration process, a user of the level gauge places the level gauge on a flat top surface of the table as plan P1 and the output voltage from the accelerometer is $V_F$ with a tilted angle $\theta_F = \theta 1 + \theta_\Delta$.

$$V_F = V_{sensitivity} \cdot \sin(\theta 1 + \theta_\Delta) + V_{offset} \quad (18)$$

Then the level gauge is rotated 180° horizontally along a vertical axis on the top surface of the table as shown in FIGS. 4A and 4B.

$$V_B = V_{sensitivity} \cdot \sin(\theta_\Delta - \theta 1) + V_{offset} \quad (19)$$

Then the device is flipped upside down as shown in FIG. 6. The output voltage of the accelerometer is $V_R$ and the angular direction of the accelerometer is $\theta_R$:

$$\theta_R = 180° - \theta_s + \theta_\Delta + \theta 1$$

$$V_R = V_{sensitivity} \cdot \sin(180° - \theta_s + \theta_\Delta + \theta 1) + V_{offset} \quad (20)$$

According to Equations (18), (19), and (20), and the known values of $\theta_s$ and $\theta_\Delta$, the microprocessor 120 is able to solve the Equations (18) to (20) to compute three parameters of unknown values for $\theta 1$, $V_{sensitivity}$, $V_{offset}$.

According to the above descriptions, the values of $V_{sensitivity}$ and $V_{offset}$ are obtained without requiring special calibration equipment as shown in FIGS. 2 and 3. The calibration processes is carried out for a level gauge without significant deformed package-shape caused by external impacts. So long as the values of $\theta_s$, $\theta_\Delta$ are substantially unchanged from the original manufacturer's values, then the parameters that include $V_{sensitivity}$ and $V_{offset}$ can be obtained according to the above processes.

In order to determine whether the package housing structure has significant impacted and deformed from the original shape, two tables with tabletop surface having significant different tilt angles are needed. The above-described processing steps can be applied to calculate the values of $V_{sensitivity}$ or $V_{offset}$. When there are significant differences between the values obtained from these two table top-surfaces that exceed the-threshold value, then it is determined that an enclosing housing structure has been deformed and the original values of $\theta_s$, $\theta_\Delta$ are significantly changed. The deformed level gauge must be repaired to fix the problems such that accurate calibration and angle measurements of the level gauge implemented with the accelerometer can be properly calibrated and operated without significant errors.

Three surfaces are applied for parameter calibration by placing the level gauge on the table along three different orientations. When the external shape of a device is not convenient for parameter calibration as described above, then the measurements and calibration can be arranged to have the voltage output generated when a device is placed on a side surface. The same principles and computational equations as shown above may be flexibly applied to resolve the operation difficulties by placing the level gauge on three different planes along three different angles.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A method for calibrating an offset and sensitivity for an accelerometer comprising:

placing said accelerometer on three flat surfaces by placing a Y-shaped frame on a table top and placing said accelerometer on said table top as said first flat surface, placing said accelerometer on a first branch of said Y-shaped frame as said second flat surface, and placing said accelerometer on a second branch of said Y-shaped frame as said third flat surface wherein said first branch and second branch of said Y-shaped frame is maintained at fixed angles relative to said table top; and measuring three output voltages of said accelerometer when said accelerometer is placed on each of said three flat surfaces and inputting said three output voltages of said accelerometer and said relative angles among said three flat surfaces to a microprocessor to calculate and calibrate said offset and sensitivity for said accelerometer.

2. The method of claim 1 further comprising a step of:

said step of placing said accelerometer on three flat surfaces further comprising a step of placing said Y-shaped frame on said table top with said second branch of said Y-shaped frame perpendicular to said first branch of said Y-shaped frame.

3. The method of claim 1 further comprising:

calibrating an offset angle $\theta_\Delta$ of a level gauge implemented with said accelerometer by placing said level gauge implemented with said accelerometer on a table-top surface having a tilt angle $\theta 1$ and measuring a tilt angle $\theta_F$ from said level gauge and an output voltage $V_F$ from said accelerometer, then rotating said level gauge 180 degrees on said table-top surface along a perpendicular axis relative to said table top surface and measuring a tilt angle $\theta_B$ from said level gauge and measuring an output voltage $V_B$ from said accelerometer for calculating said offset angle $\theta_\Delta$ of said level gauge.

4. The method of claim 3 wherein:

said step of calculating said offset angle $\theta_\Delta$ of said level gauge further comprising a step of applying and solving following equations:

$\theta_F = \theta 1 + \theta_\Delta$, and $V_F = V_{sensitivity} \cdot \sin(\theta 1 + \theta_\Delta) + V_{offset}$ and $\theta_B = \theta_\Delta - \theta 1$ $V_B = V_{sensitivity} \cdot \sin(\theta_\Delta - \theta 1) + V_{offset}$ to compute the offset angle $\theta_\Delta$ of said level gauge.

5. The method of claim 1 further comprising:

measuring and calculating said offset $V_{sensitivity}$ and sensitivity $V_{offset}$ on two sets of said three flat surfaces having substantially different relative angles among said three flat surfaces for comparing values of said offset $V_{sensitivity}$ and sensitivity $V_{offset}$ and sending said accelerometer to a repair shop if a difference between said values of said offset $V_{sensitivity}$ and sensitivity $V_{offset}$ measured and calculated with said two sets of said three flat surfaces by applying said microprocessor exceeding a threshold value.

6. A method for calibrating an offset and sensitivity for an accelerometer comprising:

placing said accelerometer on three flat surfaces by placing a triangular frame with a bottom side on a table top and placing said accelerometer on said table top as said first flat surface, placing said accelerometer on a first side of said triangular frame as said second flat surface, and placing said accelerometer on a second side of said triangular frame as said third flat surface wherein said first side and second side of said triangular frame is maintained at fixed angles relative to said table top; and measuring three output voltages of said accelerometer when said accelerometer is placed on each of said three flat surfaces and inputting said three output voltages of said accelerometer and said relative angles among said three flat surfaces to a microprocessor to calculate and calibrate said offset and sensitivity for said accelerometer.

7. The method of claim 6 further comprising a step of:

said step of placing said accelerometer on three flat surfaces further comprising a step of placing said triangular frame with said bottom side on said table top with said second side of said triangular frame perpendicular to said first side of said triangular frame.

8. A method for calibrating an offset $V_{offset}$ and sensitivity $V_{sensitivity}$ for an accelerometer implemented in a level gauge having a known value of an offset angle $\theta_A$ and a known value of a relative angle between top-and-bottom surface $\theta_s$ comprising:

placing said level gauge implemented with said accelerometer on a table-top surface having a tilt angle θ1 and measuring a tilt angle $\theta_F$ from said level gauge and an output voltage $V_F$ from said accelerometer, then rotating said level gauge 180 degrees on said table-top surface along a perpendicular axis relative to said table top surface and measuring a tilt angle $\theta_B$ from said level gauge and measuring an output voltage $V_B$ from said accelerometer; and flipping said level gauge upside down on said table-top surface and measuring a tilt angle $\theta_R$ from said level gauge and an output voltage $V_R$ from said accelerometer and inputting said output voltages of $V_F$, $V_B$, and $V_R$ of said accelerometer and said tilt angles $\theta_F$, $\theta_B$, and $\theta_R$ to microprocessor for executing a program in said microprocessor for calculating a tilt angle $\theta_1$ of said table-top surface and said offset $V_{offset}$ and sensitivity $V_{sensitivity}$ of said accelerometer by applying said known value of said offset angle $\theta_A$ and said known value of said relative angle between top-and-bottom surface $\theta_s$.

9. The method of claim 8 wherein:

said step of calculating said tilt angle $\theta_1$ of said table-top surface and said offset $V_{offset}$ and sensitivity $V_{sensitivity}$ of said accelerometer further comprising a step of executing a program in said microprocessor by applying and solving following equations:

$\theta_F = \theta1 + \theta_A$ $V_F = V_{sensitivity} \cdot \sin(\theta1 + \theta_A) + V_{offset}$ $V_B = V_{sensitivity} \cdot \sin(\theta_A - \theta1) + V_{offset}$ $\theta_R = 180° - \theta_s + \theta_A + \theta1$ $V_R = V_{sensitivity} \cdot \sin(180° - \theta_s + \theta_A + \theta1) + V_{offset}$ by applying the known of said offset angle $\theta_A$ and said known value of said relative angle between top-and-bottom surface $\theta_s$.

10. The method of claim 8 further comprising:

measuring and calculating said offset $V_{sensitivity}$ and sensitivity $V_{offset}$ on two of said table-top surfaces having substantially different tilt angles for comparing values of said offset $V_{sensitivity}$ and sensitivity $V_{offset}$ and sending said accelerometer to a repair shop if a difference between said values of said offset $V_{sensitivity}$ and sensitivity $V_{offset}$ measured and calculated with two of said table-top surfaces by applying said microprocessor exceeding a threshold value.

\* \* \* \* \*